(12) United States Patent
Stirland

(10) Patent No.: US 8,897,403 B2
(45) Date of Patent: Nov. 25, 2014

(54) ANTENNA

(75) Inventor: Simon John Stirland, Stevenage (GB)

(73) Assignee: Astrium Limited, Stevenage (GB)

( * ) Notice: Subject to any disclaimer, the term of this patent is extended or adjusted under 35 U.S.C. 154(b) by 154 days.

(21) Appl. No.: 13/806,527

(22) PCT Filed: Jun. 22, 2011

(86) PCT No.: PCT/EP2011/060522
§ 371 (c)(1),
(2), (4) Date: Mar. 12, 2013

(87) PCT Pub. No.: WO2011/161198
PCT Pub. Date: Dec. 29, 2011

(65) Prior Publication Data
US 2013/0163705 A1 Jun. 27, 2013

(30) Foreign Application Priority Data

Jun. 23, 2010 (EP) .................................. 10275065

(51) Int. Cl.
*H04B 7/10* (2006.01)
*H04L 1/02* (2006.01)
*H01Q 3/40* (2006.01)
*H04B 7/08* (2006.01)
*H01Q 3/26* (2006.01)

(52) U.S. Cl.
CPC ................ *H01Q 3/40* (2013.01); *H04B 7/086* (2013.01); *H01Q 3/26* (2013.01)
USPC .......... 375/347; 375/346; 375/349; 455/63.1; 455/501; 455/139; 455/296; 342/368; 342/371; 342/372

(58) Field of Classification Search
CPC ......... H04L 27/2647; H04L 1/20; H04L 1/06; H04L 25/0204; H04B 1/123; H04B 1/1036; H04B 7/0845; H04B 7/0854; H04B 7/0857; H04B 7/002; H04B 1/109; H04B 1/1027; H04B 15/00; H04B 17/0057; H04B 1/525; H04B 7/084; H04B 7/12; H04B 7/0865; H04B 7/0851; H04B 1/30; H04W 16/28; H04W 72/082; H04W 16/14; H04W 28/04; H04W 24/00; H01Q 3/26; H01Q 3/267; H01Q 21/0025; H01Q 25/00; H01Q 3/22; H01Q 3/34; H01Q 3/42; H01Q 3/2605; H01Q 3/36; H01Q 3/2676
USPC ......... 375/347, 346, 349; 455/63.1, 501, 139, 455/296; 342/368, 371, 372
See application file for complete search history.

(56) References Cited

U.S. PATENT DOCUMENTS 4,780,721 A * 10/1988 Dobson .......................... 342/178
5,977,910 A 11/1999 Matthews
(Continued)

FOREIGN PATENT DOCUMENTS

EP 0 896 383 A2 2/1999
EP 1 742 081 A2 1/2007
(Continued)

OTHER PUBLICATIONS

International Search Report (PCT/ISA/210) issued on Aug. 23, 2011, by the European Patent Office as the International Searching Authority for International Application No. PCT/EP2011/060522.

(Continued)

*Primary Examiner* — Phuong Phu
(74) *Attorney, Agent, or Firm* — Buchanan Ingersoll & Rooney PC

(57) ABSTRACT

A phased array antenna for providing a radiation pattern having at least one communication beam, includes a plurality of antenna elements, each with an antenna element signal having a phase relationship and an amplitude relationship to the other element signals; a digital signal processing arrangement providing a digital beamforming network; and an analog beamforming network arranged to reduce exposure of the digital signal processing arrangement to an interfering signal. Analog beamforming weights are selected to generate a null in the radiation pattern in a direction corresponding to the interfering signal.

15 Claims, 7 Drawing Sheets

(56) References Cited

U.S. PATENT DOCUMENTS

| | | |
|---|---|---|
| 7,260,370 B2 * | 8/2007 | Wang et al. .................... 455/135 |
| 7,873,326 B2 * | 1/2011 | Sadr .......................... 455/67.16 |
| 2004/0043794 A1 * | 3/2004 | Nakaya et al. ................. 455/561 |
| 2007/0001897 A1 | 1/2007 | Alland |
| 2007/0096982 A1 | 5/2007 | Kalian et al. |
| 2007/0210959 A1 | 9/2007 | Herd et al. |
| 2007/0285312 A1 | 12/2007 | Gao et al. |
| 2008/0150802 A1 | 6/2008 | Kalian et al. |

FOREIGN PATENT DOCUMENTS

| | | |
|---|---|---|
| WO | WO 2007/053213 A1 | 5/2007 |
| WO | WO 2007/103589 A2 | 9/2007 |

OTHER PUBLICATIONS

Written Opinion (PCT/ISA/237) issued on Aug. 23, 2011, by the European Patent Office as the International Searching Authority for International Application No. PCT/EP2011/060522.

Xiaojing Huang et al., "A Hybrid Adaptive Antenna Array", IEEE Transactions on Wireless Communications, vol. 9, No. 5, May 2010, pp. 1770-1779.

Notification Concerning Transmittal of International Preliminary Report on Patentability (Chapter I of the Patent Cooperation Treaty) (Form/IB/326), PCT International Preliminary Report on Patentability (Form PCT/IB/373), Written Opinion of the International Searching Authority (Form PCT/ISA/237) issued on Jan. 10, 2013, in corresponding International Application No. PCT/EP2011/060522. (10 pages).

* cited by examiner

ANTENNA

FIELD OF THE INVENTION

The invention relates to beamforming for an antenna. The invention also relates to an antenna and a method for reducing the exposure of components of the antenna to interfering signals.

BACKGROUND OF THE INVENTION

It is often desired to generate multiple spot beams in commercial communication satellites. Multiple spot beams can be generated by using a multi-element antenna and beamforming the signals received or transmitted by the antenna.

By using digital beamforming techniques and applying complex digital weights to the antenna element signals for each communication frequency channel, a large number of narrow spot beams can be achieved. However, digital beamformers have a limited dynamic range. A typical dynamic range for a digital beamformer is around 50 dB. Because of the limited dynamic range, digital beamformers can be vulnerable to high power interfering signals when operating in receive mode. The dynamic range can be increased but at high costs. Moreover, a sufficiently strong interfering signal, directed at the communication satellite, can render the digital beamformer inoperative. Interfering signals with a high power can also saturate other digital signal processing components of the antenna.

It is known to partition elements of a multi-element antenna into a number of subarrays in order to reduce the number of beamforming control points in the digital beamforming network and thereby simplify the beamforming network.

The invention was made in this context.

SUMMARY OF THE INVENTION

According to the invention, there is provided a phased array antenna for providing a radiation pattern comprising at least one communication beam in a geographical region, the antenna comprising a plurality of antenna elements, each antenna element having an antenna element signal having a phase relationship and an amplitude relationship to the other element signals; a digital signal processing arrangement providing a digital beamforming network; and an analogue beamforming network arranged to reduce exposure of the digital signal processing arrangement to an interfering signal, the analogue beamforming network being operable to apply analogue beamforming weights, selected to generate a null in said radiation pattern in a direction corresponding to the interfering signal, to signals received from said antenna elements, and the digital beam forming network being configured to apply digital beamforming weights for each of said at least one communication beams to signals received from said analogue beamforming network such that the composite radiation pattern of the antenna provides said at least one communication beams.

By generating the null, the phased array antenna can prevent or greatly reduce the exposure of the digital beamforming network to interfering signals.

The antenna elements may be partitioned into a plurality of overlapping subarrays, each subarray comprising a subset of all the antenna elements. The analogue beamforming network may be configured to allocate to elements of each subarray respective subarray beam-forming weights to create said null and the digital beam forming network may be configured to allocate to each subarray beam-forming weights for said at least one communication beam so as to produce said at least one communication beam within said region.

The digital signal processing arrangement is therefore connected not directly to individual antenna elements, but to the analogue beamforming network coupled to subarrays of antenna elements.

The analogue beamforming network may be configured to create more than one null. Each subarray may comprise more than two elements. A subarray generally needs to include at least one more element than the number of nulls it is arranged to generate. An antenna element may participate in a number of subarrays that is equal to the number of elements per subarray.

The analogue beamforming network may comprise a number of output ports and the digital signal processing arrangement comprises a number of input ports, each subarray being coupled to an output port and each output port being coupled to a separate input port for the digital signal processing arrangement. The analogue beamforming network may be operable to apply, when no nulls are desired, beamforming weights to elements of each subarray such that each signal provided to an output port is from a different single antenna element. The number of output ports of the analogue beamforming network may be equal to the number of antenna elements.

The digital beamforming network may comprise at least one control point for each antenna element.

The analogue beamforming network may comprise phase and amplitude weighting means coupled to each antenna element for applying beamforming weights to signals from the antenna elements and a summing device for each subarray for summing the weighted signals. Each antenna element signal may be split into a number of signal portions equal to the number of subarrays in which that antenna element participates and a separate phase and amplitude weight may be applied to each signal portion.

The phased array antenna may further comprise digital to analogue conversion means between the analogue beamforming network and the digital beamforming network.

The phased array antenna may further comprise a plurality of frequency demultiplexers, each demultiplexer being configured to demultiplex the output of a subarray into a plurality of frequency channels and wherein the digital beamforming network comprises at least one digital beamformer for each of the plurality of frequency channels, each digital beamformer being coupled to receive respective frequency channel signals from each subarray output and being arranged to apply a complex weight to each of said respective frequency channel signals and to sum the weighted channel signals to provide a channel output signal.

The antenna elements may be arranged in two dimensions and each subarray may extend in both dimensions.

According to the invention, there is also provided a satellite communication system comprising the phased array antenna.

According to the invention, there is also provided a method of operating a phased array antenna for providing a radiation pattern comprising at least one communication beam in a geographical region, said phased array antenna comprising a plurality of antenna elements, each antenna element having an antenna element signal having a phase relationship and an amplitude relationship to the other element signals, a digital signal processing arrangement providing a digital beamforming network, and an analogue beamforming network arranged to reduce exposure of the digital signal processing arrangement to an interfering signal, the method comprising: allocating, in the analogue beamforming network, analogue beamforming weights to signals received from said antenna elements to generate a null in said radiation pattern in a direction corresponding to the interfering signal, providing output signals from said analogue beamforming network to the digital beamforming network; and allocating digital beamforming weights for each of said at least one communication beams to said output signals of said analogue beamforming network to generate a composite radiation pattern of the antenna having said at least one communication beams.

The method may further comprise partitioning said antenna elements into a plurality of overlapping subarrays, each subarray comprising a subset of all the antenna elements, wherein allocating beamforming weights to said signals received from said antenna elements comprises allocating to elements of each subarray respective subarray weights, wherein providing output signals from said analogue beamforming network comprising summing weighted signals from elements of each subarray to provide an output signal for each subarray to the digital beamforming network, and wherein allocating beamforming weights to said output signals comprises allocating to each subarray respective beamforming weights for each of said at least one communication beam to provide said at least one communication beams.

BRIEF DESCRIPTION OF THE DRAWINGS

Embodiments of the invention will now be described, by way of example, with reference to FIGS. 1 to 10b of the accompanying drawings, in which.

DETAILED DESCRIPTION

Figure 1:
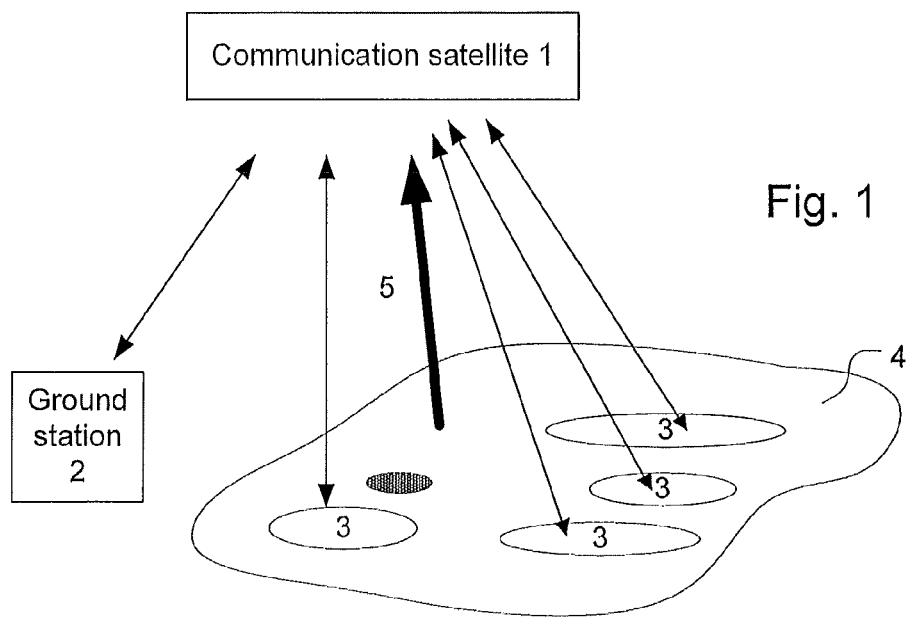
FIG. 1 shows a satellite communication system.

With reference to FIG. 1, a satellite communication system comprises a communication satellite 1 in communication with a control ground station 2. The satellite 1 is configured to produce a plurality of communications beams 3 in the form of spot beams within a predefined geographical region 4. The satellite may be a geostationary satellite providing coverage over a global area. FIG. 1 also shows an interfering signal 5 originating in the geographical region 4 and being directed at the communication satellite. The interfering signal may interfere with reception of the wanted spot beam signals.

Figure 2:
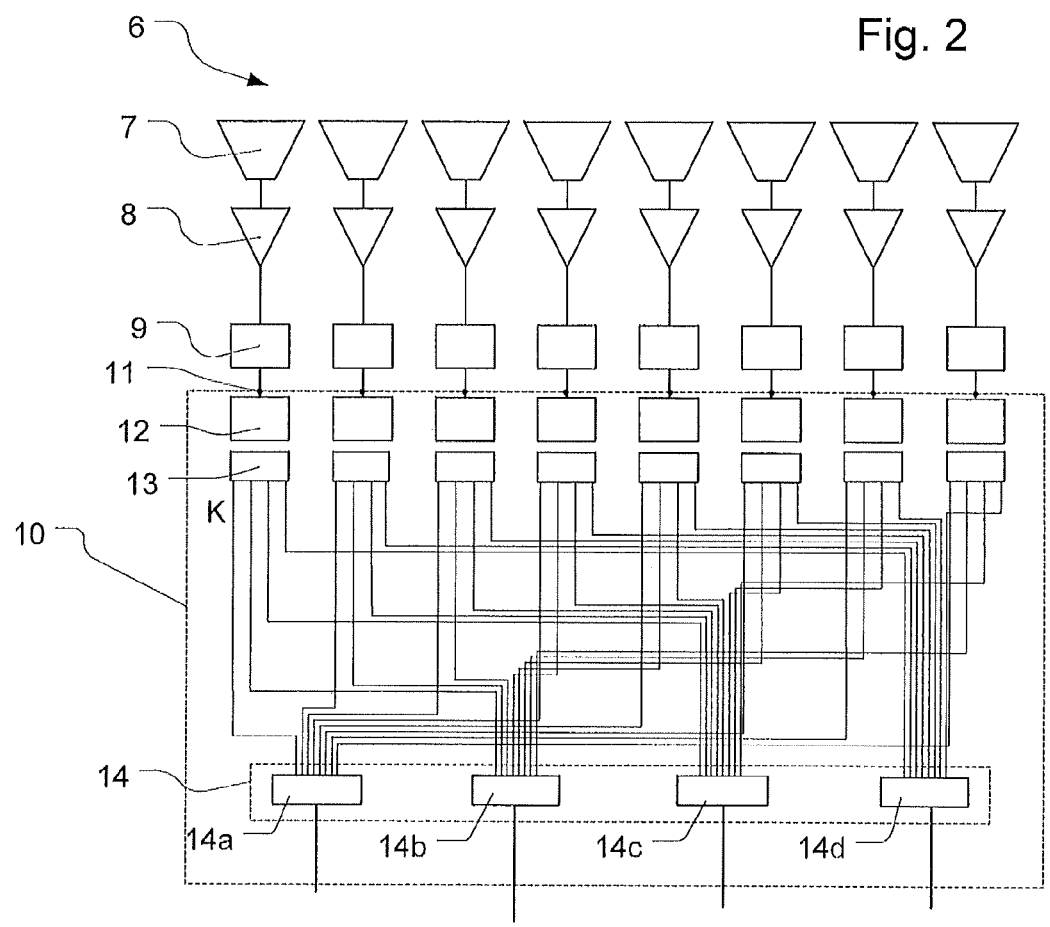
FIG. 2 is a schematic diagram illustrating components of a prior art phased array receive antenna.

With reference to FIG. 2, a conventional phased array receive antenna 6 for receiving the spot beams from the geographical region is shown. The phased array receive antenna 6 may be a direct radiating array (DRA) antenna. The conventional phased array receive antenna comprises an aperture formed by a plurality of antenna elements 7. FIG. 2 only shows one row of antenna elements. However, it should be realised that the antenna elements can be arranged in a two-dimensional array. Each element provides a receive element signal to a respective low noise amplifier 8. Each low noise amplifier output is connected to a respective down-converter 9 for down-converting the signal to an intermediate frequency in which the signal can be processed in the satellite. The down-converters may be connected to a common local oscillator frequency source (not shown) to maintain phase tracking between the signals. The signals may also be filtered and processed further.

After the signals have been down-converted and further processed in the analogue domain, the signals are provided to a digital signal processor 10. The digital signal processor comprises a plurality of input ports 11. Each antenna element signal is directed to a different input port. Each input is connected to an analogue to digital converter (ADC) 12 for digitising the signals received from the antenna elements. The digitised signals are then provided to demultiplexers 13 for demultiplexing the received signal into its frequency components. For example, the received radiation may comprise K frequency channels which are contained in the spot beams formed within the overall coverage of the antenna. Each antenna element signal is demultiplexed into the K separate frequency channels in the respective demultiplexers. The channel signals are then provided to a plurality of digital beamformers 14a, 14b, 14c, 14d forming a beamforming network 14. There is at least one beamformer for each frequency channel. More than one beamformer may be provided for one or more frequency channels to allow frequency reuse. Each beamformer may take as input all the different element signal components of a particular frequency band and applies digital complex weights to the different element signal components before summing the weighted signals so as to create the spot beams. The combined and beamformed channel signals are then output by the digital beamformers 14a, 14b, 14c, 14d. The beamformed channel signals can be processed further in a transmit communication link. For example, the transmit communication link may also include beamformers.

Due to the limited dynamic range of components of the digital signal processor 10, an interfering signal can cause a conventional phased array receive antenna 6 to malfunction. A digital beamformer typically has a range of 50 dB but different ranges are possible. An interfering signal with a signal power outside the range of the beamformer can therefore saturate the digital beamformer and cause the phased array to malfunction. Moreover, an interfering signal may also saturate the digital signal processor front end (for example the ADC 12) and thereby render the system inoperative at a point before the adaptive beamformers 14.

Figure 3:
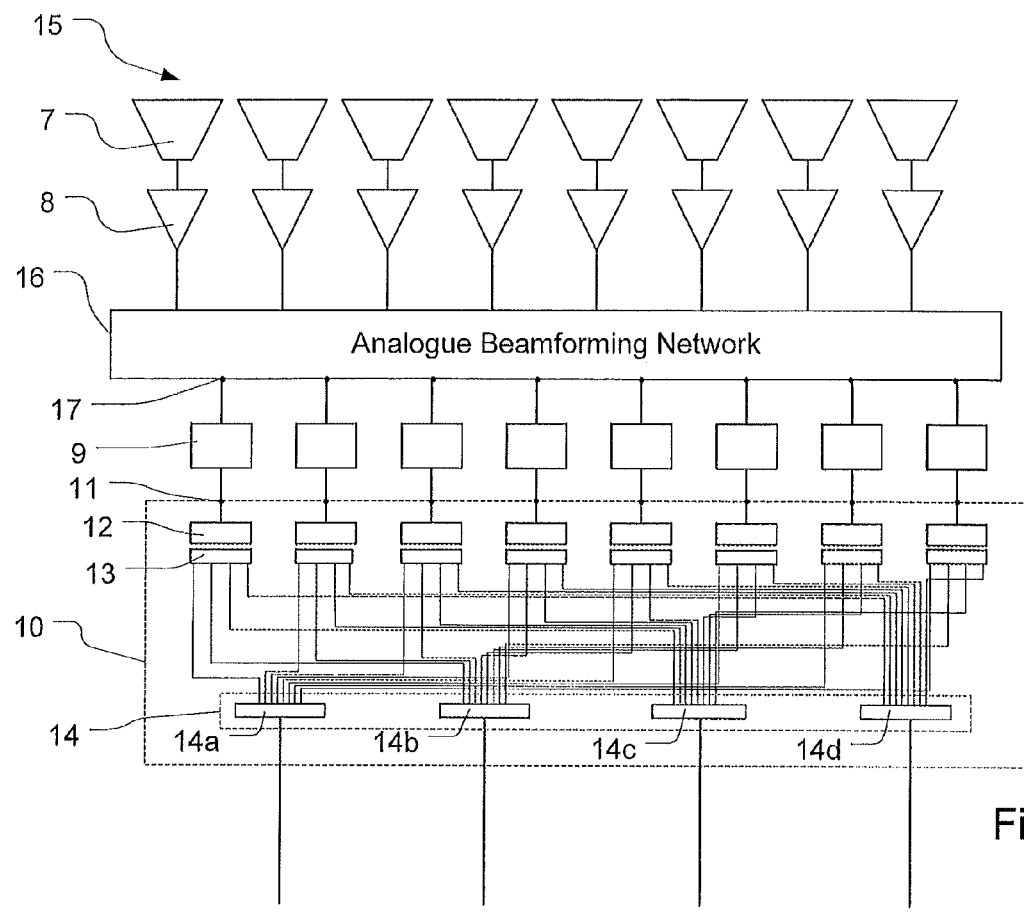
FIG. 3 is a schematic diagram illustrating the components of a phased array receive antenna according to some embodiments of the invention.

According to embodiments of the invention, exposure of the digital signal processor 10 to the interfering signal can be reduced by providing a phased array antenna 15 with an analogue beamforming layer 16 before the digital signal processor 10, as shown in FIG. 3. The analogue beam forming layer provides a network of analogue beamformers that create regions of near zero directivity or nulls in the direction of the interfering signal to stop the antenna from picking up the interfering signal. Like reference numerals in FIG. 3 denote like parts to those of FIG. 2.

The antenna 15 according to some embodiments of the invention may be a direct radiating array (DRA) antenna. However, it should be understood that other types of phased array antennas may be used. The phased array antenna 15 according to some embodiments of the invention comprises a plurality of antenna elements 7 arranged in a two-dimensional configuration. The antenna elements may be configured in a planar configuration. The element size is related to the operating frequency and to the angular size of the area on which beams are needed to scan. As an example, an antenna element in an antenna suitable for providing earth coverage from a satellite in a geostationary orbit may has a diameter equal to between 2 and 3 wavelengths of the processed signal. Consequently, for signals of approximately 8 GHz, the diameter of an element would be approximately 100 mm. The aperture of an element can be of any suitable shape. The arrays may be arranged in a triangular or square lattice. However, other suitable configurations and elements of other sizes are contemplated. The elements could for example be arranged in sparse or aperiodic arrays. The signals received by the antenna elements 7 are provided to a plurality of low noise amplifiers 8. The amplified signals are then provided to the analogue beamforming network 16 and the analogue beamforming network beamforms the signals to produce one or more nulls corresponding to the direction of interfering signals. The beamformed signals are provided from the outputs 17 of the analogue beamforming layer, with reduced or no components of the interfering signal, to a plurality of down-converters 9 and the down-converted signals are provided to the digital signal processor 10 to be digitally beamformed as described with respect to FIG. 3. There is at least one beamformer 14a, 14b, 14c, 14d in the digital signal processor 10 for each frequency channel. More than one beamformer may be provided for one or more frequency channels to allow frequency reuse.

It should be noted that, in some embodiments, the number of output ports 17 of the analogue beamforming layer and the number of inputs 11 to the digital signal processor is the same as the number of antenna elements. Each input 11 to the digital signal processor is coupled to a separate DAC 12, a separate demultiplexer 13 and one or more beamformers 14a, 14b, 14c, 14d. The beamformers 14a, 14b, 14c, 14d also receive signals from the other inputs 11. Consequently, each input 11 can be considered to correspond to at least one separate "control point" for determining beamforming weights. The phased array antenna according to the invention can therefore provide at least one digital beamforming control point for each antenna element. Consequently, the analogue beamforming layer does not reduce the number of control points for the digital beamforming network. More specifically, in the embodiments wherein the number of inputs to the digital signal processor is equal to the number of antenna elements, the number of inputs to each, or at least some, of the digital beamformers 14a, 14b, 14c and 14d may also be equal to the number of antenna elements. In other words, a digital beamformer may be configured to be able to combine a number of signals equal to the number of antenna elements. As a result, the scanning capability of the antenna may not be reduced by the analogue beamforming network and full flexibility to control the antenna is maintained. Instead, the purpose of the analogue beamforming layer is to remove interference that could otherwise saturate the digital beamformers and other components of the digital signal processor. As will be described in more detail below, when the analogue beamforming layer is operated to generate nulls, a small proportion of the outputs and inputs may not be used. However, when no nulls are required, the number of outputs and inputs used may be the same as the number of antenna elements and a signal from a single antenna element may be received in each input 11 to the digital signal processor 10. In other words, the analogue beamforming layer can be configured to be transparent so that the digital beamforming network is effectively just connected to the array of antenna elements.

Figure 4:
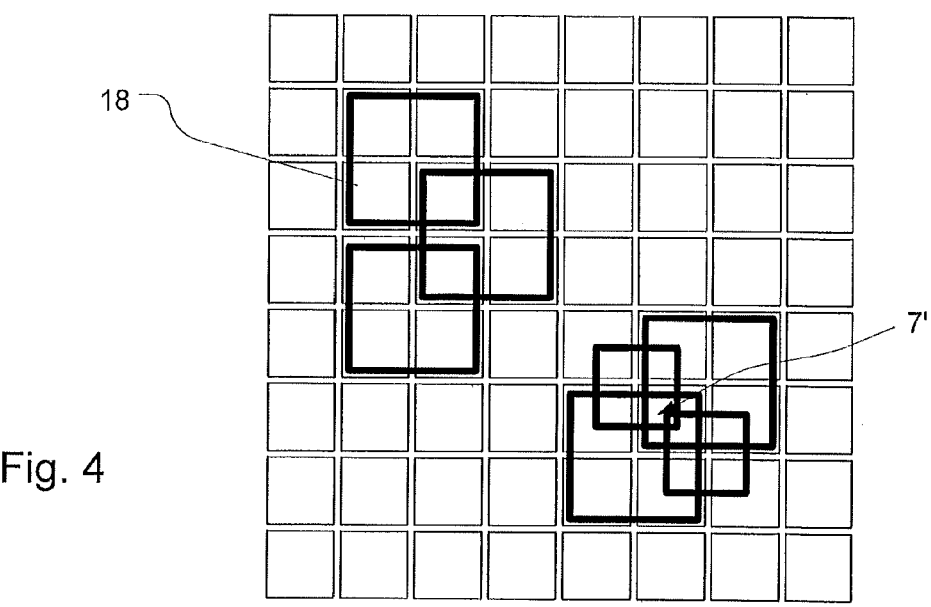
FIG. 4 illustrates how antenna elements can be arranged into subarrays.

The details of the analogue beamforming layer 16 will now be described. The analogue beamforming layer partitions the array of antenna elements 7 into a plurality of overlapping subarrays 18, as shown in FIG. 4. Each subarray comprises a subset of all the antenna elements. All the antenna elements, apart from some antenna elements at the edges of the antenna, participate in more than one subarray. Each antenna element signal is split into a number of portions corresponding to the number of subarrays to which the antenna element belongs. Each signal portion is amplitude and phase weighted and all the weighted element signal portions for a particular subarray are summed to provide a combined signal for each subarray. It is contemplated that in some embodiments, the same weight set is applied to each subarray. In other embodiments, different weight sets are used for each subarray. The weights applied within the subarray are selected to generate the necessary nulls to avoid picking up interfering signals. The radiation pattern formed by the subarray provides an envelope to the patterns that may be formed by the overall phased array antenna so that the subarray pattern covers a region with areas of zero directivity from which no signals are received.

In some embodiments, the weight sets for creating the nulls can be determined at a ground based location, for example the ground station 2, based on information about the interfering signals and their origins. Instructions for applying the determined weights sets can be sent to the communication satellite from a control centre on ground.

Given the weight sets for the subarrays, the complex weights for the digital beamformer can then be determined to generate the spot beams. The complex weights are determined such that there is a uniform phase gradient across the set of overlapped subarrays and such that the subarray patterns add coherently in the required direction. The selection of complex weights for the generation of spot beams will be understood by the skilled person and will not be described in detail herein. As mentioned above, if a frequency channel is reused in more than one spot beam, more than one digital beamformer may be provided for that frequency channel and each digital beamformer forms a separate beam.

With reference to FIG. 4, in one example, the aperture of the phased array may comprise 64 antenna elements and the antenna elements may be divided into subarrays of 4 elements each. The subarrays overlap and each element participates in multiple subarrays. As indicated for element 7' in FIG. 4, if each subarray comprises four elements, an element may participate in four different subarrays.

Subarrays comprising four elements each can be configured to produce three separate nulls simultaneously. In order to generate four nulls, each subarray would have to comprise five elements. In other words, each subarray would have to include one more element than the number of nulls the subarray is arranged to produce. If the phased array is only required to create one null, the subarrays only have to include two elements each.

In some array configurations, two-element subarrays may have an unwanted effect on the pattern in other directions than the desired direction since a two-element null can, in some array configurations, generate a line null perpendicular to the line joining the elements. The undesired effect can be avoided if not all the 2-element subarrays are oriented the same way. Alternatively or additionally, the undesired effect can be avoided if at least some of the arrays are comprised of more than two elements.

In some embodiments, the subarrays can be rearranged if additional or fewer nulls are required. In other embodiments, the subarrays are hard-wired. It is contemplated that when the subarrays are hard-wired the subarrays are arranged to handle a maximum number of nulls appropriate for the application in which the antenna is used. If the antenna is subjected to interfering signals from a number of directions higher than the maximum number of nulls that can be generated by the arrays, the digital beamformers may still malfunction. To stop the digital beamformers from malfunctioning, the low noise amplifiers 8 can be used to simply attenuate the signal coming out of the low noise amplifier into the digital beamformer. Of course, this would result in a reduced signal level to noise ratio and reduced sensitivity of the payload of the satellite.

Figure 5:
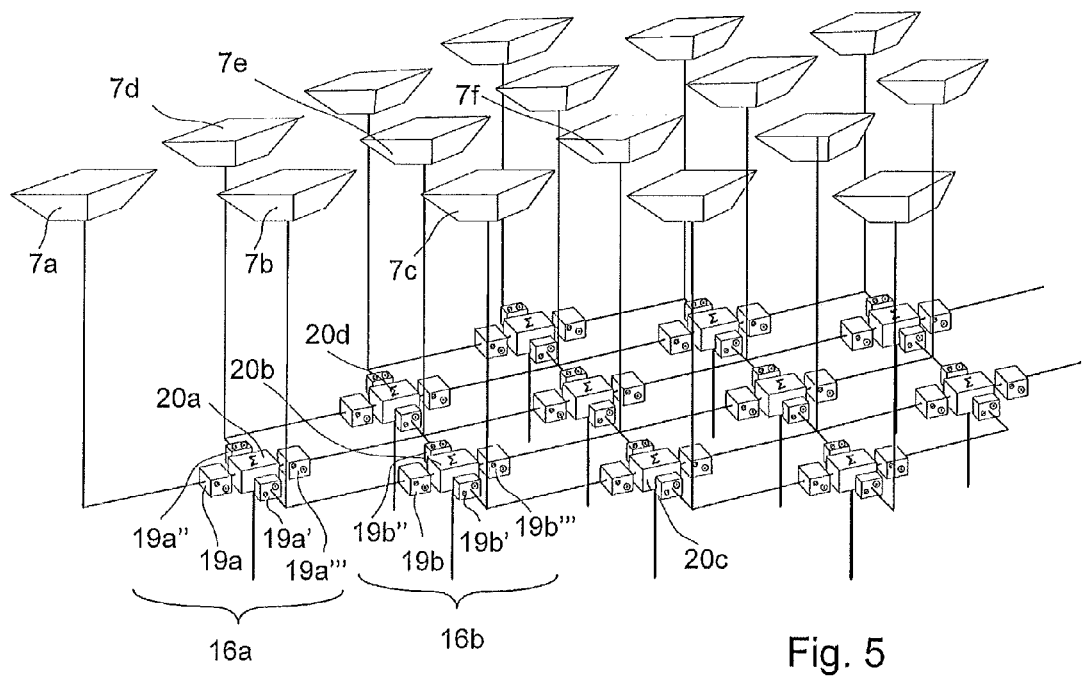
FIG. 5 illustrates how the signals from the elements in each subarrays are combined.

With reference to FIG. 5, a perspective view of the components of the analogue beamforming layer 16 and a plurality of antenna elements, 7a to 7f, is shown. The low noise amplifiers 8 have been omitted from the diagram for the purpose of clarity. Signal splitters for dividing the signal from the low noise amplifier into a number of signals corresponding to the number of elements in each subarray have also been omitted for the sake of clarity. The analogue beamforming layer 16 comprises a plurality of amplitude and phase weighting devices 19a, 19a' . . . 19b", 19b''' and a plurality of summation devices 20a, 20b, 20c, 20d to sum weighted element contributions to provide the overall subarray output. The amplitude and phase weighting devices and the summation device for a particular subarray make up the analogue beamformer 16a, 16b for that subarray. As can be seen in FIG. 5, in the analogue beamforming layer, each element signal is split into four components and each component is weighted in its respective amplitude and phase weighting device. The weighted components from four elements of a subarray are then summed in the summing device associated with that subarray. The output from the summing device is provided to the down-converters (not shown in FIG. 5). It should be realised that although a single device for adjusting both the phase and the amplitude is shown in FIG. 5, the phase and amplitude may be adjusted in separate devices.

Figure 6:
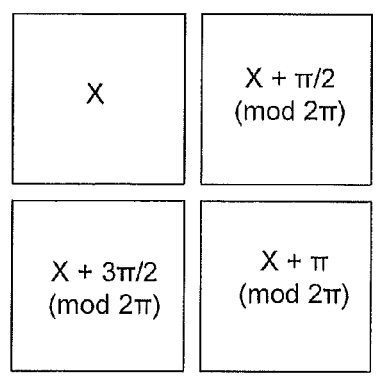
FIG. 6 illustrates one subarray weight set for generating a null.

By adjusting the phase of each contribution signal with respect to the phase of the other contribution signals, the null can be created. FIG. 6 shows one way of setting the phase within a subarray to create a null, wherein the phase of each element signal in a clock-wise direction is shifted by 90 degrees or $\pi/2$. If the signal from one of the elements in a subarray has a phase $\Phi_1=X$ degrees with respect to a reference, the phase of the signal from the next element in a clockwise direction is set to $\Phi_2=X+\pi/2 \pmod{2\pi}$, the phase of the signal from the third element is set to $\Phi_3=X+\pi \pmod{2\pi}$ and the phase of the signal from the fourth element is set to $\Phi_4=X+3\pi/2 \pmod{2\pi}$. If x equals 0 degrees, $\Phi_2$ equals 90 degrees, $\Phi_3$ equals 180 degrees, and $\Phi_4$ equals 270 degrees. If the respective phases were set as shown in the example of FIG. 6, the null would be created in the boresight. By changing the respective phases of the signals from the different elements of the subarray, the null can be moved away from the boresight. The pattern of the subarray, including the null, can be steered by applying a further phase gradient across it, as would be understood by the skilled person.

It should be realised that when nulling is not required, the phase and amplitude weighting devices are set such that only one of the element signal contributions has a non-zero amplitude. Consequently, with respect to FIG. 5 again, amplitude and phase weighting device 19a of analogue beamformer 16a may be set to allow the signal portion from antenna element 7a through, while amplitude weighting devices 19a', 19a" and 19a''' may be set to block the contributions from elements 7b, 7d and 7e respectively. Moreover, amplitude weighting device 19b of analogue beamformer 16b may be set to let the signal from element 7b through while amplitude weighting devices 19b', 19b" and 19b''' of analogue beamformer 16b may be set to block the contributions from antenna elements 7c, 7e and 7f respectively. Consequently, the signal at each output corresponds to a single antenna element. In other words, the amplitude and phase weighting devices can be set such that the analogue beamforming network 16 does not affect the signals from the antenna elements. All the beamforming is then carried out in the digital beamforming network 14.

Figure 7A:
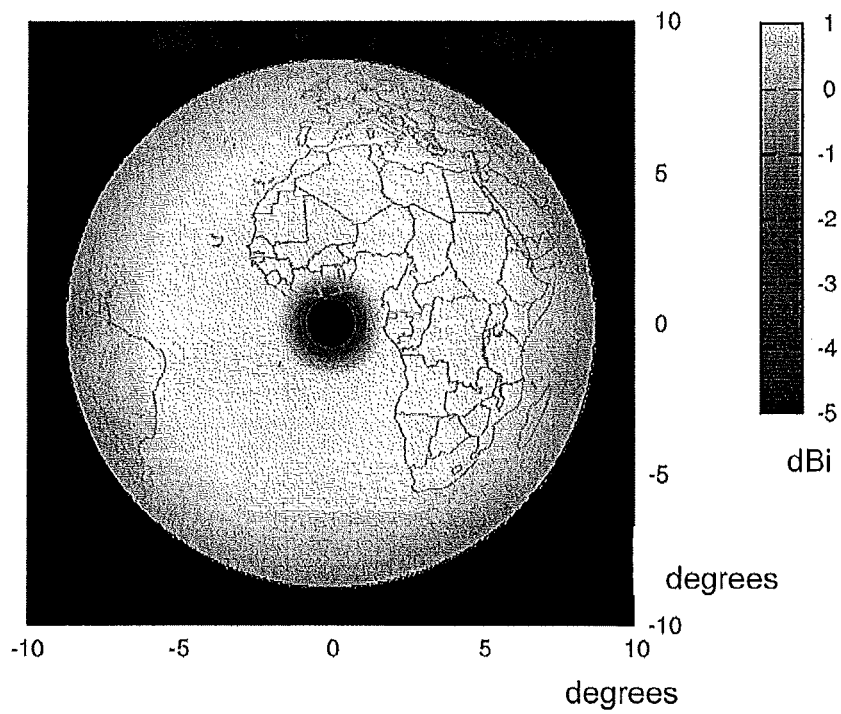
FIG. 7a shows a radiation pattern with a null created using a digital beamforming network.
Figure 7B:
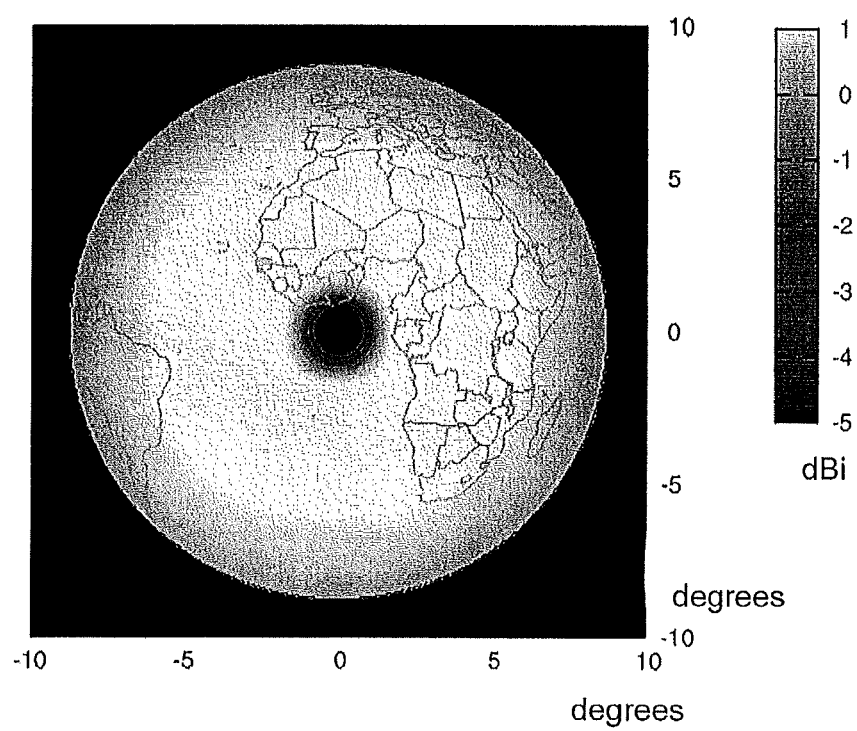
FIG. 7b shows a corresponding radiation pattern with the null created by an analogue beamforming network.

FIGS. 7a and 7b show a radiation pattern with a null created within a spot beam. FIGS. 7a and 7b illustrate how the analogue beamforming layer does not have a detrimental effect on the spot beams created as part of a radiation pattern with one null. The intensity of the radiation pattern is given in units of dBi (decibel isotropic). FIG. 7a shows a radiation pattern with the null and the spot beam formed in the digital beamforming network. FIG. 7b shows a radiation pattern with the null formed in the analogue beamforming network 16 and the spot beam formed in the digital beamforming network 14. It is clear from FIGS. 7a and 7b that with one null, the directivity of the spot beam is not significantly affected by the pre-nulling step. If the null is placed in the direction of an interfering signal, the analogue layer can be used to block the interfering signal from reaching the digital beamformer without detrimental effect to the overall spot beam directivity.

Figure 8A:
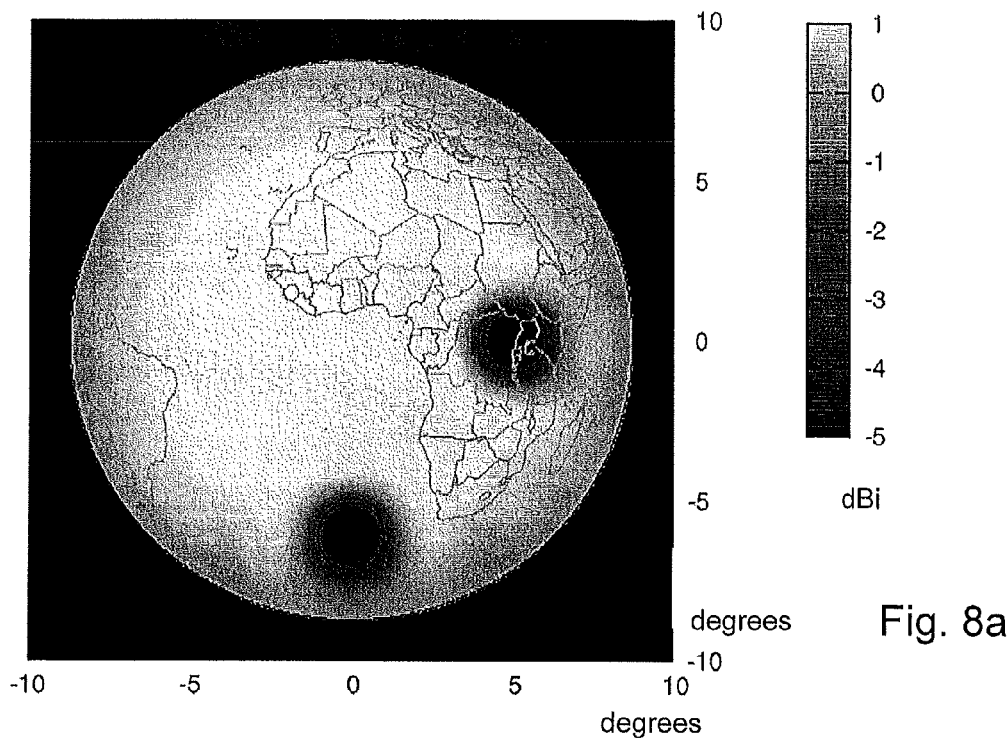
FIG. 8a shows a second radiation pattern with two nulls created using a digital beamforming network.
Figure 8B:
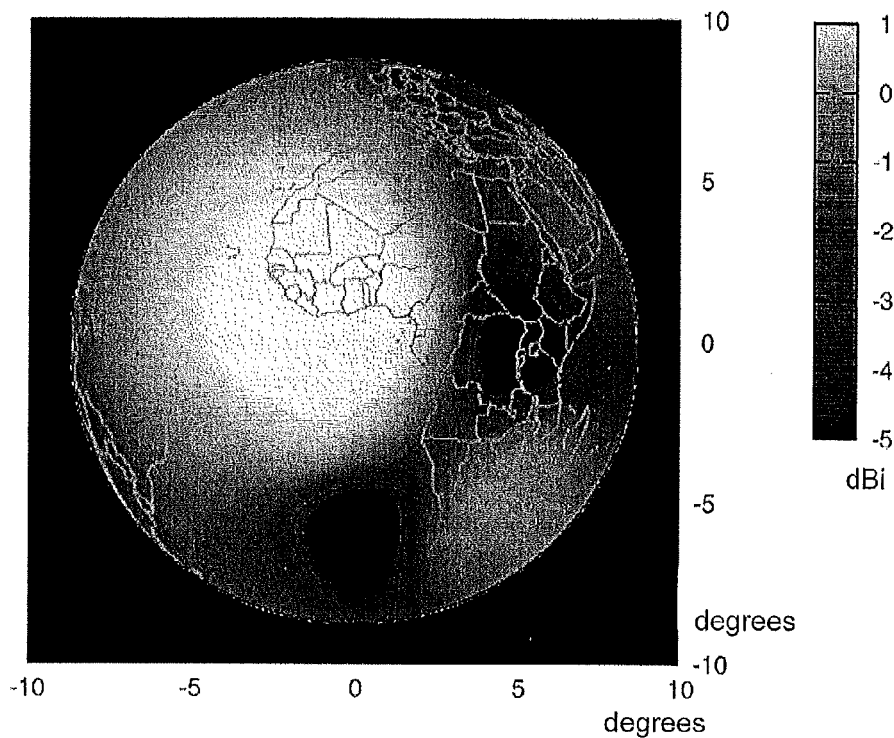
FIG. 8b shows a radiation pattern corresponding to the second radiation pattern with the two nulls created using an analogue beamforming network.

FIGS. 8a and 8b show a radiation pattern with two nulls. The intensity of the radiation pattern is given in units of dBi (decibel isotropic). The nulls have been formed in the digital beamforming layer in FIG. 8a and in the analogue layer in FIG. 8b. As can be seen, the analogue pre-nulling step has some effect on the directivity of the spot beam within which the nulls are formed in that the processing in the analogue layer causes the region covered by the spot beam to be reduced. However, if the signal levels of the interfering signals were high enough, a conventional phased array antenna that only comprises digital beamformers would not have been able to receive the wanted signals since the interfering signal would have jammed the digital processor. A phased array antenna that includes an analogue beamforming layer according to the invention would still be able to receive the signals but from a reduced area. In many applications, the reduced area would be more than sufficient to be able to generate the required beams.

Figure 9A:
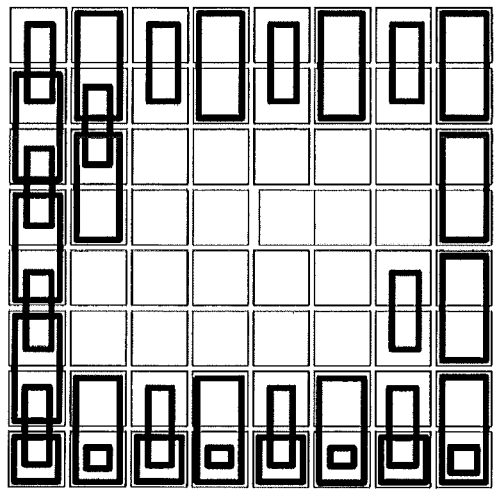
FIGS. 9a, 9b and 9c illustrate how antenna elements can be arranged into subarrays.

A reason for the reduced spot beam when the analogue layer generates two nulls is that the larger the subarrays required, the smaller the number of complete subarrays that can be formed and the smaller the number of subarray output signals provided to the digital beamformers. As mentioned above, a subarray must include one more element than the number of nulls it is configured to generate. As shown with respect to FIG. 9a, in an aperture comprising 64 elements divided into two-element subarrays, there is space for 8 subarrays in a first dimension and seven subarrays in a second dimension, creating a total of 56 two-element subarrays. The last subarray in each column would only comprise one element which would not be sufficient to produce a null. Consequently, 56 signals instead of 64 signals would be provided to the digital signal processor when the subarrays are arranged to generate one null. The use of 56 control points out of the total 64 control points of the digital beamforming network is sufficiently close to the maximum 64 control points for the pattern not to be affected significantly by the pre-nulling step.

Figure 9B:
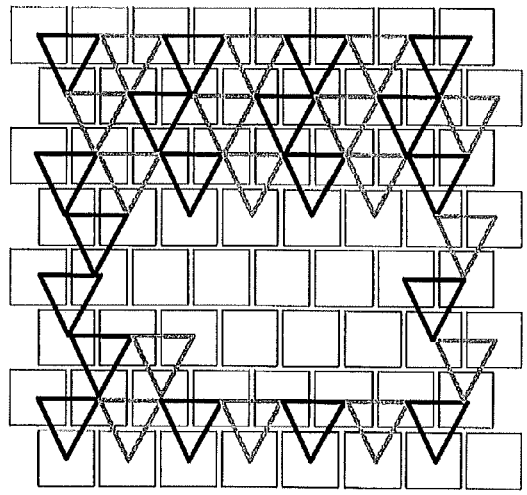
Figure 9C:
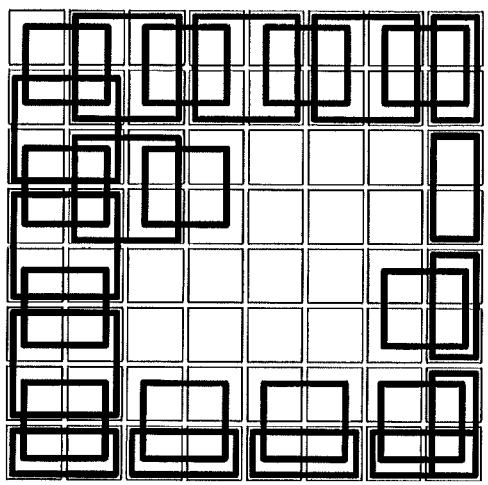

However, for 3-element, 4-element and higher element subarrays, the reduction in the number of control points used has a more noticeable effect on the radiation pattern. FIG. 9b shows an aperture of the phased array antenna having a plurality of 3-element subarrays arranged in a triangular lattice and FIG. 9c shows an aperture having a plurality of 4-element subarrays arranged in a square lattice. For both 3-element subarrays and 4-element subarrays, only 49 full 3-element or 4-element subarrays can be formed, as can be seen in FIGS. 9b and 9c. This means that only 49 out of the total 64 control points in the digital beamforming network are used in some embodiments and only a reduced spot beam pattern can be generated as a result. In some embodiments, this problem may be solved by including additional elements in the antenna.

It should be realised that although the number of subarrays used may be smaller than the number of antenna elements in some circumstances, the number of available outputs 17 of the analogue beamforming layer and the number of available inputs of the digital beamforming layer may still be equal to the number of antenna elements. Some outputs 17 may be connected to subarrays comprising fewer than the required number of elements to produce the number of nulls for which the analogue beamforming network is designed. Alternatively, some output 17 may be connected directly to antenna elements. The outputs may not be used when the antenna is operated to produce nulls in the radiation pattern. However, when no nulls are required in the radiation pattern the outputs may allow signals through from respective antenna elements to the digital beamforming network. When no nulls are required, the analogue beamforming weights are set such that each output 17 of the analogue beamforming network outputs a signal from a single antenna element. In other words, each input 11 to the digital signal processor receives a signal from a separate antenna element. Consequently, the analogue beamforming layer is designed such that when no nulls are required, it has little or no effect on the radiation pattern.

Figure 10A:
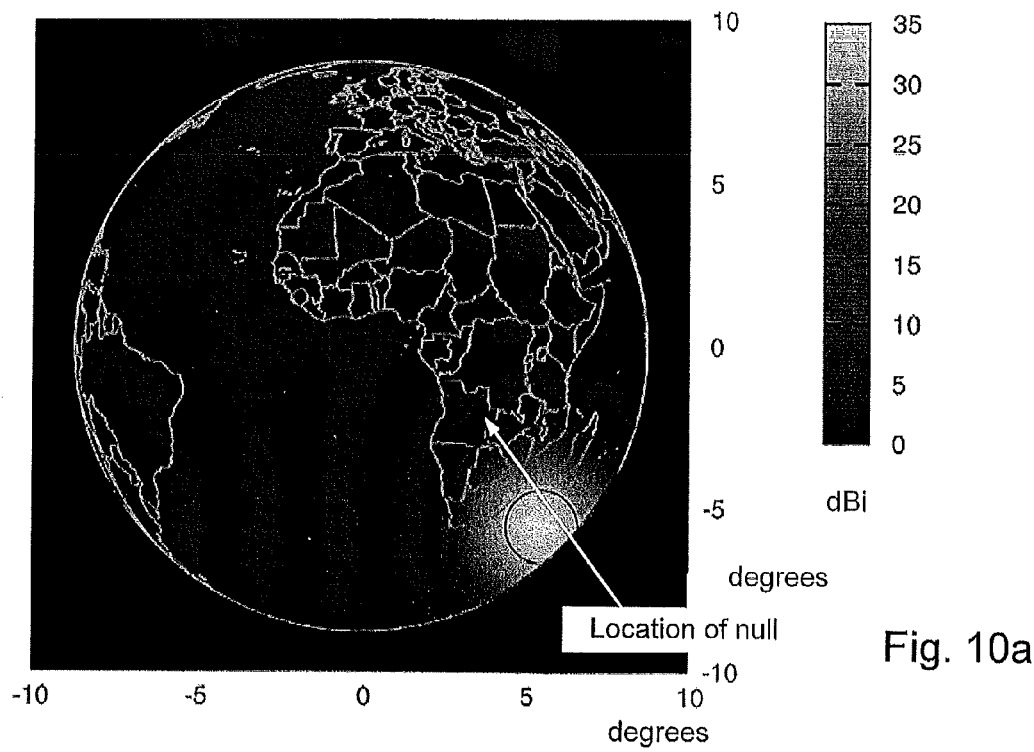
FIG. 10a shows a third radiation pattern with a null created using a digital beamforming network.
Figure 10B:
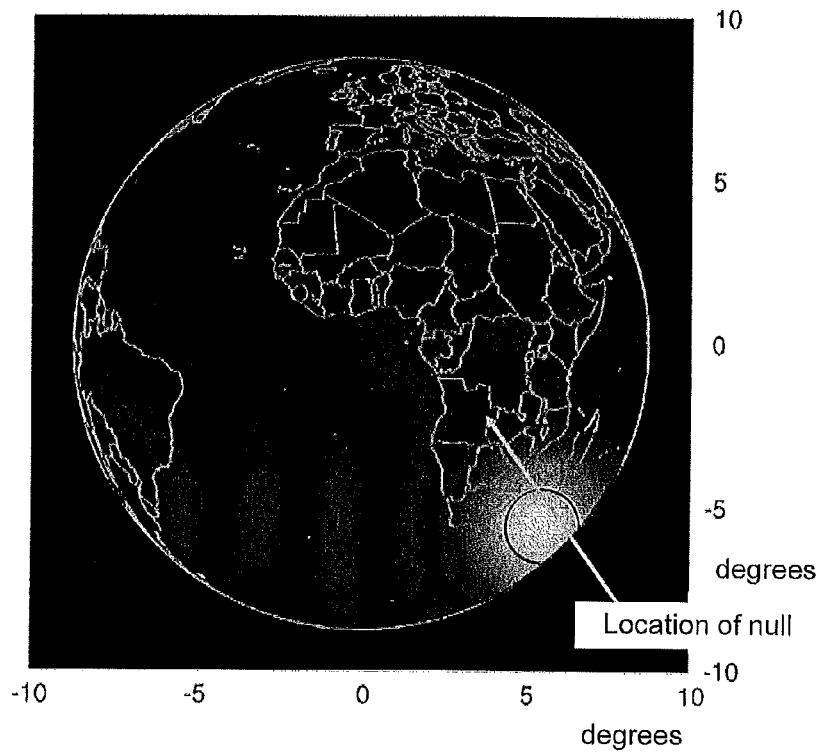
FIG. 10b shows a radiation pattern corresponding to the third radiation pattern but with the null created using an analogue beamforming network.

FIGS. 10a and 10b show a radiation pattern with one null formed outside a spot beam. The intensity of the radiation pattern is given in units of dBi (decibel isotropic). The nulls have been formed in the digital beamforming network 14 in FIG. 10a and in the analogue beamforming network 16 in FIG. 10b. The arrows indicate the location of the null. As already shown with respect to FIGS. 8a and 8b, the effect of the slightly reduced number of signals provided to the digital signal processor by the analogue beamforming network, when the analogue beamforming network is arranged to produce a single null, does not significantly affect the radiation pattern.

Whilst specific examples of the invention have been described, the scope of the invention is defined by the appended claims and not limited to the examples. The invention could therefore be implemented in other ways, as would be appreciated by those skilled in the art.

It should be understood that although a 64 element aperture has been shown, the invention can be applied to any size of the aperture and any number of elements in the aperture. Moreover, although elements and arrays of specific shapes and configuration have been shown, any suitable shape, size and configuration can be used.

Moreover, the invention is not limited to a direct radiating array antenna. The invention may be implemented in any type of suitable antenna using an array of antenna elements.

Instead of a direct radiating antenna, an antenna using reflectors can be used. Moreover, the antenna does not necessarily have to be used in a communication satellite. The invention can be used to reduce exposure of components of any antenna to interfering signals.

The invention claimed is:

1. A phased array antenna for providing a radiation pattern having at least one communication beam, the antenna comprising:
   a plurality of antenna elements, wherein each antenna element will have an antenna element signal having a phase relationship and an amplitude relationship to the other element signals;
   a digital signal processing arrangement for providing a digital beamforming network; and
   an analogue beamforming network arranged for reducing exposure of the digital signal processing arrangement to an interfering signal, the analogue beamforming network being configured to apply analogue beamforming weights selected to generate a null in a radiation pattern in a direction corresponding to the interfering signal to signals received from said antenna elements, and the digital beamforming network being configured for applying digital beamforming weights for each of said at least one communication beam to signals received from said analogue beamforming network such that a composite radiation pattern of the antenna will provide said at least one communication beam.

2. A phased array antenna according to claim 1, wherein said antenna elements are partitioned into a plurality of overlapping subarrays, each subarray comprising:
   a subset of all the antenna elements, said analogue beamforming network being configured to allocate to elements of each subarray respective subarray beam-forming weights for creating said null and said digital beamforming network being configured for allocating to each subarray beamforming weights for said at least one communication beam so as to produce said at least one communication beam.

3. A phased array antenna according to claim 2, wherein said analogue beam-forming network is configured for creating more than one null in a radiation pattern.

4. A phased array antenna according to claim 3, wherein each subarray comprises more than two antenna elements.

5. A phased array antenna according to claim 2, wherein each of a plurality of antenna elements will participate in a number of subarrays equal to the number of elements per subarray.

6. A phased array antenna according to claim 5, wherein the analogue beamforming network comprises:
   a number of output ports and the digital signal processor comprises a number of input ports, each subarray being coupled to an output port and each output port being coupled to a separate input port of the digital signal processor and wherein the number of output ports of the analogue beamforming network is equal to the number of antenna elements of the phased array antenna.

7. A phased array antenna according to claim 6, wherein the analogue beamforming network is operable to apply, when no nulls are desired, beamforming weights to elements of each subarray such that each signal provided to an output port will be from a different single antenna element.

8. A phased array antenna according to claim 2, wherein the digital beamforming network comprises:
   at least one control point for each antenna element.

9. A phased array antenna according to claim 2, wherein said analogue beamforming network comprises:
   phase weighting and amplitude weighting means coupled to each antenna element for applying beamforming weights to signals from the antenna elements; and
   a summing device for each subarray for summing the weighted signals.

10. A phased array antenna according to claim 2, comprising:
    analogue to digital conversion means between the analogue beamforming network and the digital beamforming network.

11. A phased array antenna according to claim 2, comprising:
    a plurality of frequency demultiplexers, each demultiplexer being configured to demultiplex an output of a subarray into a plurality of frequency channels and wherein the digital beamforming network comprises:
    at least one digital beamformer for each of the plurality of frequency channels, each digital beamformer being coupled for receiving respective frequency channel signals from each subarray output and being arranged for applying a complex weight to each of said respective frequency channel signals and for summing the weighted channel signals to provide a channel output signal.

12. A phased array antenna according to claim 2, wherein said antenna elements are arranged in two dimensions and each subarray extends in both dimensions.

13. A satellite communication system in combination with a phased array antenna according to claim 1.

14. A method of operating a phased array antenna for providing at least one communication beam, said phased array antenna having a plurality of antenna elements, each antenna element having an antenna element signal having a phase relationship and an amplitude relationship to the other element signals, a digital signal processing arrangement providing a digital beamforming network, and an analogue beamforming network arranged to reduce exposure of the digital signal processing arrangement to an interfering signal, the method comprising:
   allocating, in the analogue beamforming network, analogue beamforming weights to signals received from said antenna elements to generate a null in a direction corresponding to the interfering signal;
   providing output signals from said analogue beamforming network to the digital beamforming network; and
   allocating digital beamforming weights, in the digital beamforming network, for each of said at least one communication beams to said output signals of said analogue beamforming network such that a composite radiation pattern of the antenna provides said at least one communication beam.

15. A method according to claim 14, comprising:
   partitioning said antenna elements into a plurality of overlapping subarrays, each subarray having a subset of all the antenna elements;
   wherein allocating beamforming weights to said signals received from said antenna elements includes allocating to elements of each subarray respective subarray weights;
   wherein providing output signals from said analogue beamforming network includes summing weighted signals from elements of each subarray to provide an output signal for each subarray to the digital beamforming network; and
   wherein allocating beamforming weights to said output signals includes allocating to each subarray respective beamforming weights for said at least one communication beam to provide said at least one communication beam.

* * * * *